United States Patent
Anglin et al.

(10) Patent No.: US 8,295,678 B2
(45) Date of Patent: Oct. 23, 2012

(54) UNIVERSAL METHOD OF CONTROLLING THE RECORDING OF AUDIO-VISUAL PRESENTATIONS BY DATA PROCESSOR CONTROLLED RECORDING DEVICES

(75) Inventors: Debbie Ann Anglin, Austin, TX (US); Howard Neil Anglin, Austin, TX (US); Frank Anthony Nuzzi, Round Rock, TX (US); Jan Rogoyski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1570 days.

(21) Appl. No.: 11/426,430

(22) Filed: Jun. 26, 2006

(65) Prior Publication Data
US 2007/0299871 A1    Dec. 27, 2007

(51) Int. Cl.
*H04N 9/80* (2006.01)
*H04N 7/16* (2011.01)
(52) U.S. Cl. ........ 386/248; 386/239; 386/326; 709/223; 725/1
(58) Field of Classification Search ............ 386/46, 386/52, 83, 124–126, 239, 252, 326, 248; 725/25, 1, 2, 4, 74, 78; 709/223–225; 726/2–7, 726/16, 17, 21, 26–33
See application file for complete search history.

(56) References Cited

U.S. PATENT DOCUMENTS

| | | | | |
|---|---|---|---|---|
| 5,434,678 | A  * | 7/1995  | Abecassis | 386/52 |
| 6,157,377 | A  * | 12/2000 | Shah-Nazaroff et al. | 715/719 |
| 6,246,797 | B1   | 6/2001  | Caster et al. | |
| 6,885,395 | B1   | 4/2005  | Rabbani et al. | |
| 2002/0196938 | A1* | 12/2002 | Sako et al. | 380/210 |
| 2004/0075750 | A1  | 4/2004  | Bateman | |
| 2004/0243708 | A1* | 12/2004 | Stebbings | 709/225 |
| 2005/0086079 | A1* | 4/2005  | Graves et al. | 705/2 |
| 2006/0031870 | A1* | 2/2006  | Jarman et al. | 725/25 |
| 2006/0056797 | A1* | 3/2006  | Yun | 386/46 |
| 2007/0234390 | A1* | 10/2007 | Bankers et al. | 725/78 |

FOREIGN PATENT DOCUMENTS
JP 2004-140634  * 5/2004
* cited by examiner

*Primary Examiner* — Thai Tran
*Assistant Examiner* — Mishawn Dunn
(74) *Attorney, Agent, or Firm* — J.B. Kraft; David A. Mims

(57) ABSTRACT

Controlling the audio-visual recording by audio-visual recording devices within a facility comprising the host or owner of the facility predetermining a plurality of value levels of at least one attribute of said audio-visual content and predetermining a plurality of limitations on the recording of audio-visual content, each corresponding to each of the value levels. There is sensing the value level of said at least one attribute and limiting the recording of said audio-visual content based upon the value level of the one attribute.

14 Claims, 4 Drawing Sheets

UNIVERSAL METHOD OF CONTROLLING THE RECORDING OF AUDIO-VISUAL PRESENTATIONS BY DATA PROCESSOR CONTROLLED RECORDING DEVICES

CROSS-REFERENCE TO RELATED PATENT APPLICATION

The following copending patent application, which is assigned to the same assignee as the present invention, covers subject matter related to the subject matter of the present patent application: Application (11/426,437) filed on the same date as the present Application, entitled: CONTROLLING THE PRINT QUALITY LEVELS OF IMAGES PRINTED FROM IMAGES CAPTURED BY TRACKED IMAGE RECORDING DEVICES, D. A. Anglin et al., hereby incorporated by reference.

TECHNICAL FIELD

The present invention relates to computer controlled consumer electronics devices or instruments, and particularly to implementations for controlling the unauthorized use of audio-visual recording devices, e.g. electronic cameras, video cameras and audio recorders.

BACKGROUND OF RELATED ART

The past decade has been marked by a technological revolution driven by the convergence of the data processing industry with the consumer electronics industry. The effect has, in turn, driven consumer electronics technologies that have been known and available but relatively quiescent over the years to now come into great demand in the marketplace.

The rapid expansion in the capacity of computers to perform support functions, the greater and greater miniaturization of computers, as well as reduction in costs to perform memory and computer operations has opened the door for computer controller consumer instrumentation. This has resulted in a new generation of computer or data processor controlled audio-visual devices that are miniaturized so as to be not noticeable when carried by users. An example of this proliferation of these audio-visual devices is the video camera or video cam incorporated into a major portion of current cellular telephones. The uncontrolled usage of such devices has resulted in the unwarranted intrusion on the privacy of individual people. However, of even greater commercial and governmental significance, the uncontrolled usage of such devices results in the theft of a wide variety of commercial and governmental audio or visual presentations and transactions, which are electronic entertainment property, commercially confidential or classified as government secrets.

Accordingly, there is need to provide the owners or hosts of recordable content that may be presentations of such content or facilities that provide such content with implementations to protect the content from unauthorized recording, as well as to limit authorized recording of such content.

SUMMARY OF THE PRESENT INVENTION

The present invention is directed toward providing the owners or hosts of recordable content that may be presentations of such content or facilities that provide such content with implementations to protect the content from unauthorized recording, as well as to limit authorized recording of such content. This control must be provided to the owner or host of the facility or content who will hereinafter be referred to as the "host" of the content.

Accordingly, the present invention provides a method that enables the host to predetermine a plurality of value levels of at least one attribute of said audio-visual content and to predetermine a plurality of limitations on the recording of audio-visual content, each corresponding to each of said value levels. Then within the host controlled facility, the value level of said at least one attribute is sensed and the recording of said audio-visual content is limited based upon the value level of said at least one attribute. The step of limiting the recording may permit recording at one of said value levels and prevents recording at another of said value levels, e.g. the video cam may be permitted to be turned on or off.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
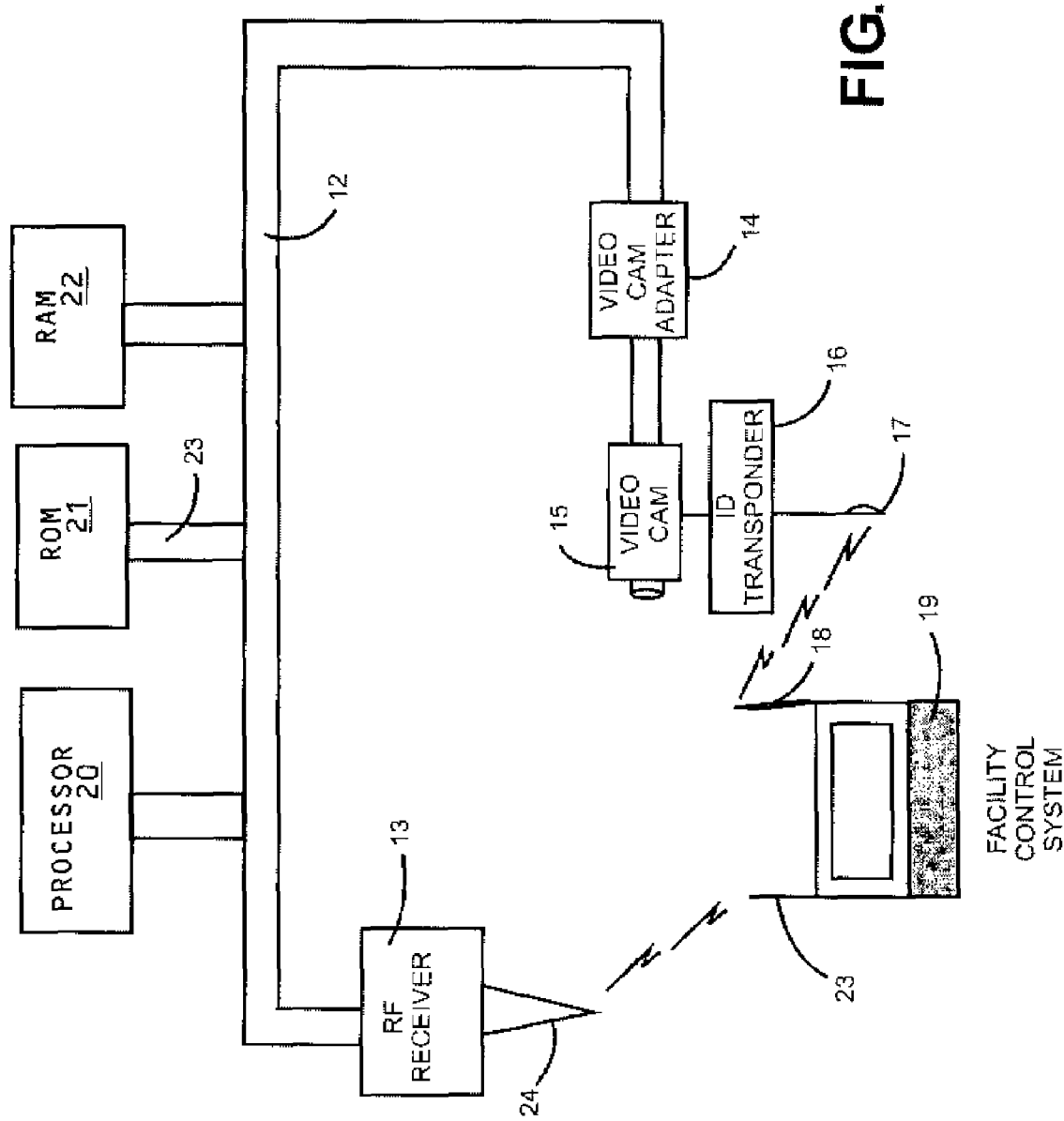
FIG. 1 is a diagrammatic general view of an exemplary data processor controlled video camera that may be controlled in accordance with the present invention operating within a facility that monitors and controls the video camera within the facility.

FIG. 1 illustrates an exemplary control system for any audio-visual recording device that is to be tracked and controlled in accordance with the present invention is shown. The control system of the present invention may be embodied in controller integrated circuit chips within the housing of the device that provides specific purpose logic to control the access and logic as follows. These logic or control chips contain data processors 20, operating systems stored in RAM 22 (about m of RAM is provided). A small ROM 21 is the primary programmable memory. However, an ancillary memory may optionally be provided through memory card (not shown) connected to system bus 12. This programmable ROM that may be an EEPROM, e.g. flash EEPROM 10. All of the routines and programs may also be conventionally stored in this flash EEPROM 21. Operating systems and built-in applications may also be conventionally stored in the RAM. In the present example, the recording device being tracked and controlled by the circuitry is a video Cam 15 connected to the control circuitry through a video Cam adapter 14 connected to bus 12.

Every audio-visual recording device should have an identifier 16. In order for the system of the present invention to be commercially feasible, identifiers must be required on all audio-visual recording devices required by either laws or industry standards as a safeguard against the intrusions of electronic digital recording devices into personal privacy or commercial intellectual property. The identifier 16 may conveniently be an active transponder. Actually, these identifiers may be embodied as active RFID tags. Active RFID tags usually have their own power source and currently may have ranges in the order of hundreds of feet and are more expensive. Also, the active RFID tags are commonly referred to as RFID transponders. Usage of RFID tags/transponders has been extensively documented for a wide variety of tracking functions. Low frequency RFID tags are commonly used for animal identification or anti-theft systems in automobiles, for example. Higher frequency RFID tags are used for book tracking, pallet tracking or airline baggage tracking. There are, of course, well-developed technologies in the higher frequency RFID tag tracking systems, such as UHF RFID and Microwave RFID tags.

The facility control center 19, a desktop computer, receives indication of a sensed identifier through antenna 18. It is recognized, as will be hereinafter described in greater detail, that the signal between transponder antenna and facility control antenna 18 may include intermediate sensors, such as sensors 37 and 40 that sense and then transmit the sensed signal to antenna 18. The facility control system 19 may then send an appropriate control signal to control the video Cam 15 via antenna 23 transmitting to antenna 24 of RF receiver 13 connected into the control system through bus 12. The respective receivers and transmitters may operate using conventional IEEE 802.11 short range RF protocols. The IEEE 802.11 wireless transmission protocols are discussed in greater detail at pp. 60-62 in the text, *Peter Norton's Complete Guide to Networking,* SAMS Division of MacMillan Computer Publishing, Indianapolis, Ind., 1999, pp. 49-62, as well as in the article, *A Wireless Local Area Network Protocol That Improves Throughput Via Adaptive Control,* B. E. Mullins et al., *Proceedings of the IEEE International Conference on Communications,* pp. 1427-1431, June 1997.

Because, as set forth above, both the conventional IEEE 802.11 short range RF protocols, as well as RFID system technology are old and well established technologies, the technology implementation is well known and it is beyond the scope of the present invention to further detail these technologies.

Figure 2:
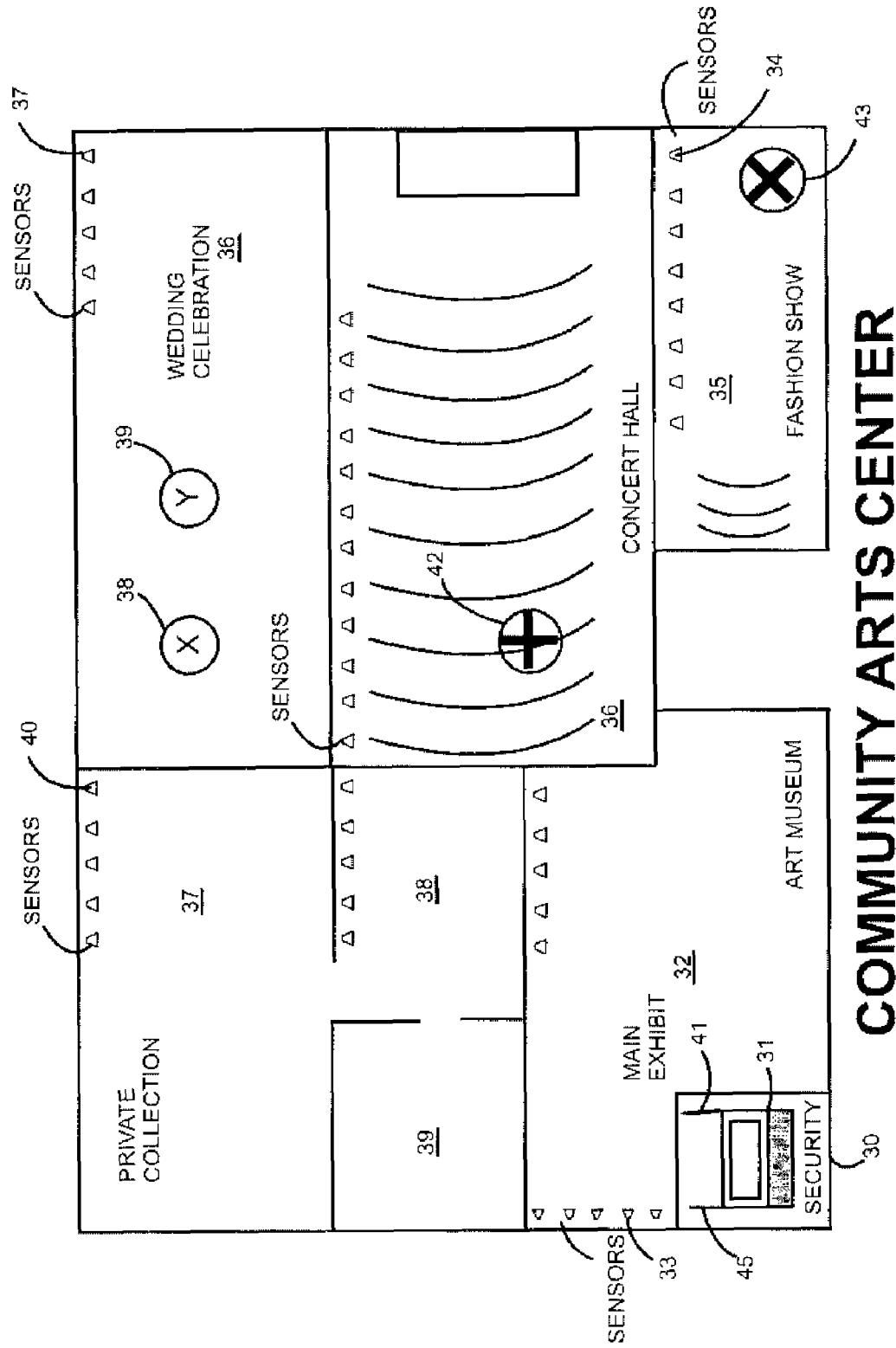
FIG. 2 is a plan view of an illustrative controlled facility that monitors and controls audio-visual recording devices within the facility in accordance with the present invention.

FIG. 2 is an illustrative overview of an exemplary embodiment of the present invention. As shown in the "Community Arts Center" facility of FIG. 2, there are banks of sensors, 33, 34, 37 and 40, that sense for the presence of the active transponders on the recording devices entering the various exhibition rooms of the facility, e.g. recording device 43 in chamber 35, recording device 42 in chamber 36 and recording devices 38 and 39 in chamber 37. It should be noted that because of the relatively short ranges of the RF transmission signals indicating the presence of a recording device that are detected by a particular sensor, the sensed signal may be transmitted through an intermediate RF transceiver before eventually reaching antenna 41 of central security computer 31 in the central facility 30. Likewise, control signals from antenna 45 on computer 31 may have to be transmitted through intermediate transceivers before reaching the controlled recording devices.

With respect to FIG. 2, there will be shown several illustrations of how the implementations of the present invention control audio-visual content that may be recorded by the processor controlled recording devices. The Community Art Center has several rooms or chambers in which various events are taking place. In room 35, assume that a fashion show is in progress. Recording device 43 is a representative recording device. Sensors 34 detect the presence and type of the recording device. This information is transmitted back via previously described RF transmissions to the security computer 31 via antenna 41. Computer 31 determines the limitations on the recording and transmits appropriate signals back to the device 43 via antenna 45. These control signals may impose a variety of limitations dependent on the type of recording device 43. If the recording device is a video camera, the control signals may turn the camera off since the host of the fashion show has specified no video recording. On the other hand, recording may be permitted without limitation, e.g. reporters may wish to record interviews with designers. In the case of still digital photographs, the hosts may be concerned with copying of their designs. Thus, the limitations may limit the resolution of the digital camera to low resolutions acceptable for news photographs but not sufficient for "knock-offs" of the exact dress designs. Similarly, signals indicating the presence of recording device 42 in concert hall 36 are transmitted back to security computer 31. The limitations then imposed upon device 42 may completely turn off all video cameras and audio recorders, but permit still digital cameras to record. On the other hand, based upon the concert host's wishes, audio recorders and video cameras may be permitted to remain on for only two or three minutes to permit such devices to record beneficial snippets of the concert for the evening news. Among other illustrations, in wedding chapel 36 wherein sensors 37 detect the presence of recording devices 38 and 39, security computer 31 may determine that device 39 is the official photographer and permit it unlimited recording. Device 38 may just be a guest that is then limited to still photographs. In the facility, there is an art museum made up of chambers 32, 37, 38 and 39. Chambers 32, 38 and 39 may include only public owned art so that recording devices in these chambers, as sensed by sensors 33, are permitted unlimited recording access. However, there is a public showing of a private collection in chamber 37. Thus, the presence of a recording device in chamber 37 as detected by sensors 40 and transmitted to security computer 31 will result in signals back to stop all recording devices in chamber 37 based upon the wishes of the private collection owner.

Figure 3:
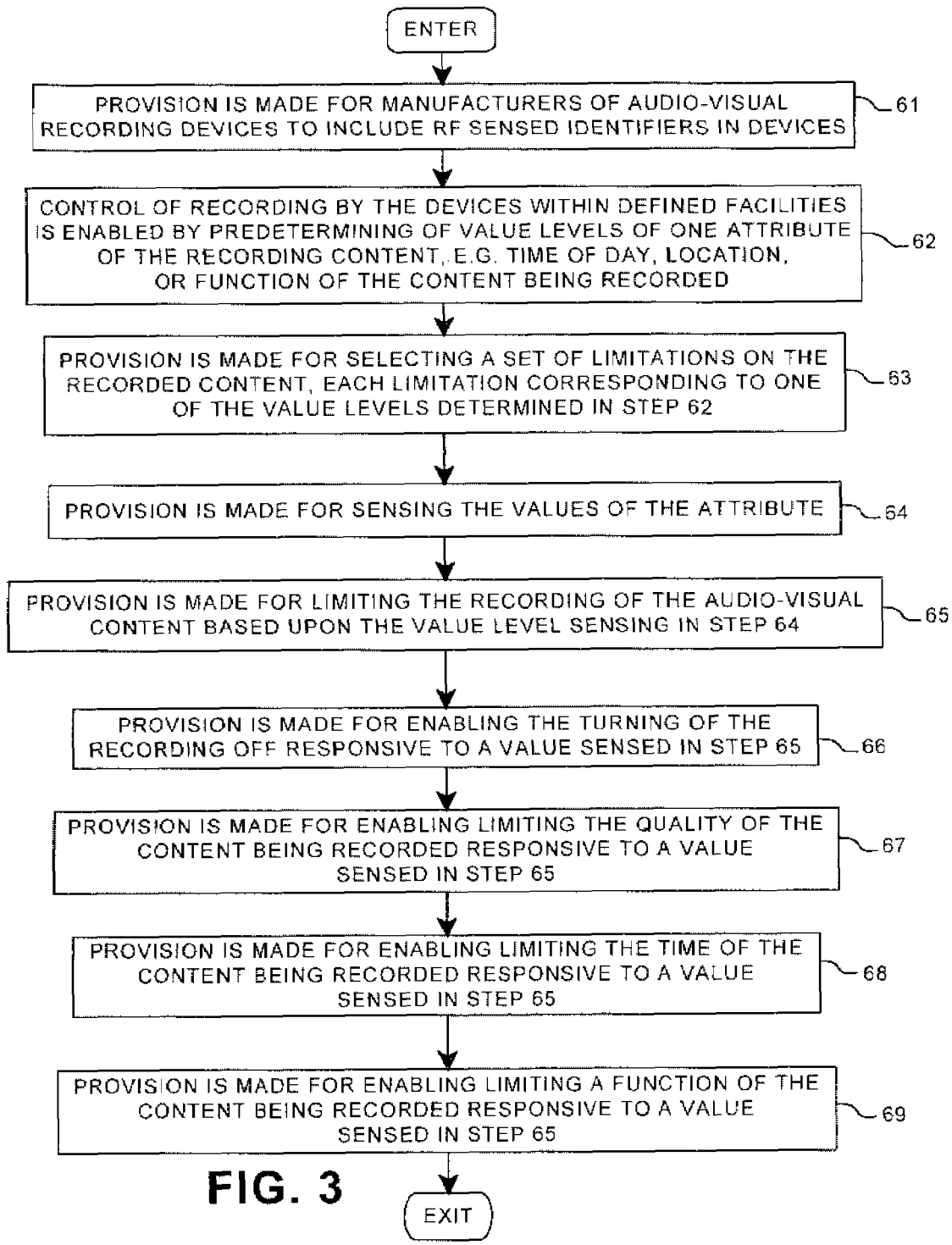
FIG. 3 is an illustrative flowchart describing the setting up of the process of the present invention for the control of audio-visual recording devices within a controlled facility.

Now, with reference to FIG. 3, there will be described a process implemented by a program according to an embodiment of the present invention for a system for controlling the use of audio-visual recording devices in facilities where such use intrudes on privacy or may result in the loss of intellectual property. Provision is made, by law or industry standards, for manufacturers of audio-visual recording devices to include identifiers capable of being sensed in the devices, step 61. The control of recording by the devices is thereby enabled by predetermining of a plurality of value levels of one or more attributes of the recording content, e.g. the time of day when it is recorded, or a function of the content being recorded, e.g. chip cleaning processes within a manufacturing facility may be recorded but chip packaging may not, step 62. Provision is made, step 63, for the selection of a set of limitations on the recorded content so that each of these limitations corresponds to one of the value levels determined in step 62. Provision is made for sensing the value of attributes, step 64. Provision is made, step 65, for limiting the recording of the audio-visual content based upon the value sensed in step 64. Provision is made, step 66, for the turning off of the audio-visual recording device in response to value sensed in step 65. Provision is made, step 67, for limiting the quality of the recorded content of the audio-visual recording device in response to value sensed in step 65. Provision is made, step 68, for limiting the time of the recorded content of the audio-visual recording device in response to value sensed in step 65. Provision is made, step 69, for limiting a function of the recorded content of the audio-visual recording device in response to value sensed in step 65.

Figure 4:
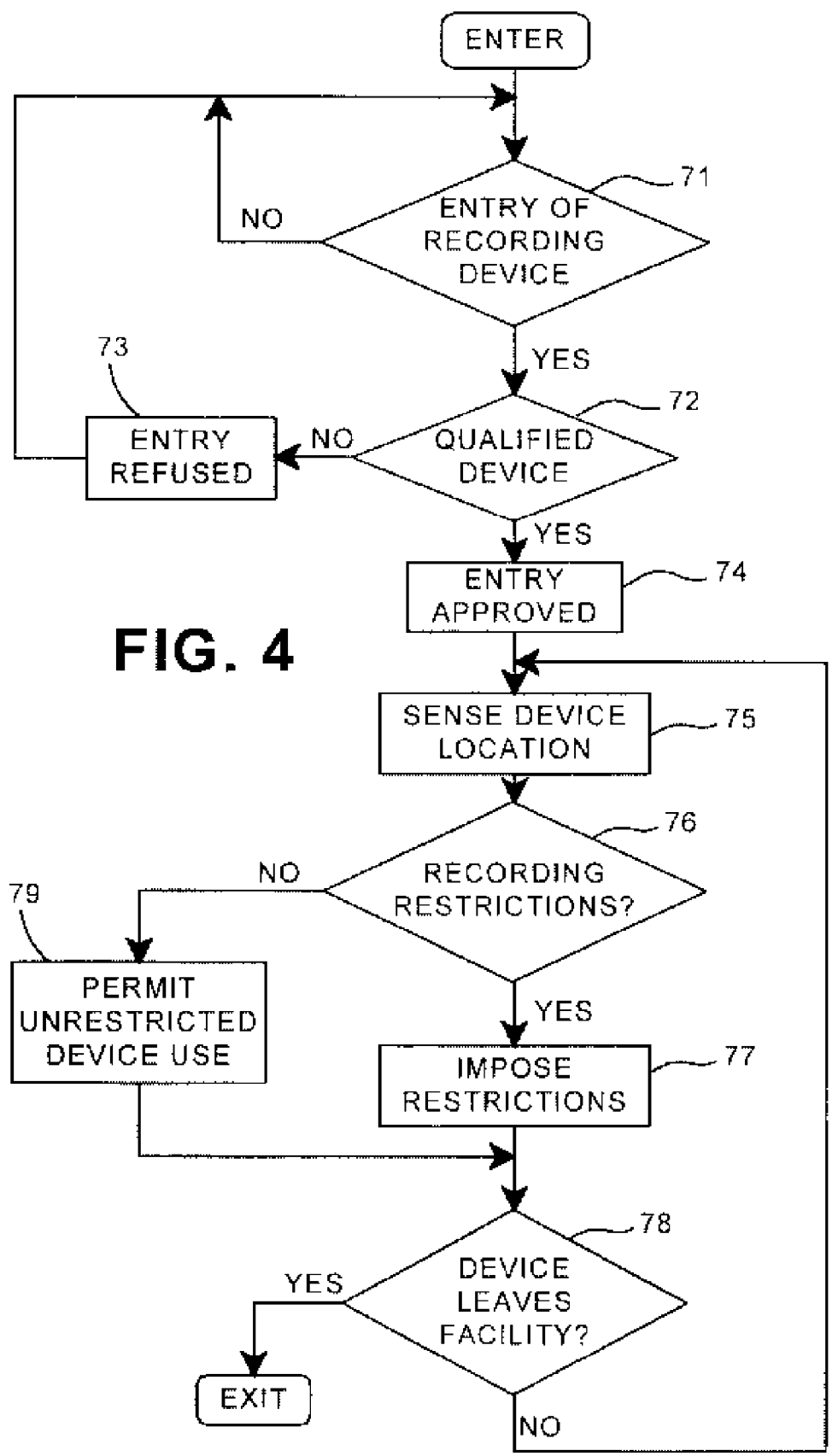
FIG. 4 is a flowchart of an illustrative run of the process set up in FIG. 3.

Now that the basic programs have been described and illustrated, there will be described with respect to FIG. 4 an exemplary flow of a simple operation showing how the program of FIG. 3 may be run to control the recording of audiovisual content by a recording device within a defined facility, an initial determination is made as to whether there is a request to enter the facility by a recording device, step 71. For example, the recording device has to be trackable, e.g. it should have a transponder so that its location may be tracked. Accordingly, an identifier put on the recording device by the vendor or manufacturer would indicate this. An industry standard could require qualified recording devices to be recognizable as such through an appropriate identifier. The facility would have an entry procedure in which only recording devices identified visually or by a scanner would be let in. If Yes, then a further determination is made as to whether the device is qualified, i.e. has an appropriate identifier, step 73. If No, entry is refused, step 73, and the process is returned to step 71. If Yes, step 74, entry is approved. The location of the device within the facility is tracked, step 75. As set forth above, there may be tracking of the location of the recording device through sensors wirelessly connected to a facility control center through RF transmission. The device may be provided with a locator routine wherein its transponder is activated when the device begins to record. The location of the recording device is communicated to the facility control center. At a particular recording location, a determination is made as to whether there are any recording restrictions, step 76. If No, unrestricted use is permitted, step 79. If Yes, the appropriate restrictions are imposed on the device, step 77. At this point, or at any point, a determination is made as to whether the recording device has left the facility, step 78. If Yes, the recording device has left the facility, the tracking is exited. If No, the device is still within the facility, then the tracking is branched back to step 75.

The aforementioned cross-referenced copending patent application provides for charging a user fees based upon a value level, i.e. the quality of prints (a value level) permitted to be made from images captured within a host facility. In addition, a user is permitted to upgrade a permitted print quality level by paying an increased fee. The same conditions may be applied to the quality levels of the attributes described in the present application. For example, a user may be permitted to record video camera images of varying resolution based upon fees paid by the user. Under such circumstances, the user may then be permitted to upgrade the resolution permitted for his recorded video camera images by paying an additional fee.

While the invention has been shown and described with reference to particular embodiments thereof, it will be understood by those skilled in the art that the foregoing and other changes in form and detail may be made therein without departing from the spirit and scope of the invention.

What is claimed is:

1. A method for controlling the direct recording of live visual content presented by a delimited area facility by a data processor controlled recording device comprising:
   enabling the content host to predetermine a plurality of value levels of recording quality of said live presented visual content;
   enabling the content host to predetermine a plurality of limitations on the recording of said quality levels of live presented visual content at locations within said delimited area facility each corresponding to each of said value levels;
   sensing the quality level of said live visual content based upon a fee charged to a user of said recording device within said delimited facility; and
   limiting the direct recording of said live visual content based upon the quality level based upon said fee charged to said user of said recording device.

2. The method of controlling the live visual content recording of claim 1 wherein said recording is digital recording.

3. The method of controlling the live visual content recording of claim 1 wherein said limiting the recording permits recording at one of said quality levels, and prevents recording at another of said quality levels.

4. The method of controlling the direct visual content recording of claim 1 further including enabling said user to increase the quality level based upon a fee charged to a user of said recording device by increasing said fee.

5. A system for controlling the recording of live visual content presented by a delimited area facility by a data processor controlled recording device comprising:
   a processor;
   a computer memory holding computer program instructions which when executed by the processor perform the method comprising:
   enabling the content host to predetermine a plurality of value levels of recording quality of said live visual content;
   enabling the content host to predetermine a plurality of limitations on the recording of said quality levels of live visual content presented at location within said delimited area facility corresponding to each of said value levels;
   sensing the quality level of said live visual content based upon a fee charged to a user of said recording device within said delimited facility; and
   limiting the direct recording of said live visual content based upon the quality level based upon said fee charged to a user of said recording device.

6. The system of claim 5 wherein said live visual recording is digital recording.

7. The system of claim 6 wherein the recording of the live visual content is in the form of a video recording.

8. The system of claim 6 wherein the recording of live visual content is in the form of a still photograph.

9. The system of claim 5 wherein said limiting the live recording permits recording at one of said quality levels, and prevents recording at another of said quality levels.

10. The system of claim 5 wherein said limiting the live recording limits the quality of the recording at a least one of said value levels.

11. A computer usable non-transitory storage medium having stored thereon a computer readable program for controlling the direct recording of live visual content by a data processor controlled recording device presented by a delimited area facility, wherein the computer readable program when executed on a computer causes the computer to:
   enable the content host to predetermine a plurality of value levels of recording quality of said live visual content;
   enable the content host to predetermine a plurality of limitations on the recording of said quality levels of live visual content presented at locations within said delimited facility corresponding to each of said value levels;
   sense the quality level of said live visual content based upon a fee charged to a user of said recording device within said delimited facility; and
   limit the direct recording of said live visual content based upon the quality level based upon said fee charged to a user of said recording device.

12. The computer usable medium of claim 11, wherein said computer program when executed limits the live recording by permitting recording at one of said quality levels, and preventing recording at another of said quality levels.

13. The computer usable medium of claim 11 wherein said live recording is a video recording.

14. The computer usable medium of claim 11 wherein said live recording is a still photograph.

* * * * *